(12) United States Patent
Wan et al.

(10) Patent No.: US 8,163,414 B2
(45) Date of Patent: Apr. 24, 2012

(54) ELECTRICAL DEVICE HAVING A BATTERY PACK WITH AN EASY ATTACHMENT AND RELEASE MECHANISM

(75) Inventors: Mohsein Wan, Bukit Mertajam Penang (MY); Manfred Lutz, Filderstadt (DE); Rofaizi Nor, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 499 days.

(21) Appl. No.: 12/356,639

(22) Filed: Jan. 21, 2009

(65) Prior Publication Data
US 2009/0286145 A1 Nov. 19, 2009

(30) Foreign Application Priority Data
Jan. 24, 2008 (EP) .................................... 08100851

(51) Int. Cl.
*H01M 2/10* (2006.01)
(52) U.S. Cl. .............................. 429/96; 292/64; 429/176

(58) Field of Classification Search ............ 429/96–100, 429/163, 164, 176; D13/103; 292/80, 81, 292/86, 87, 89, DIG. 38, DIG. 53, DIG. 54, 292/DIG. 64
See application file for complete search history.

(56) References Cited

U.S. PATENT DOCUMENTS

| | | | |
|---|---|---|---|
| 4,751,452 A | 6/1988 | Kilmer et al. | |
| 5,213,913 A | 5/1993 | Anthony, III et al. | |
| 5,455,737 A * | 10/1995 | Ogami et al. ............ | 361/679.09 |
| 5,598,082 A | 1/1997 | Gilpin et al. | |
| 6,371,535 B2 * | 4/2002 | Wei et al. ...................... | 292/175 |
| 2004/0188119 A1 | 9/2004 | Chen | |
| 2006/0228936 A1 | 10/2006 | Chen | |
| 2006/0267556 A1 | 11/2006 | Uehlein-Proctor et al. | |
| 2007/0296225 A1 * | 12/2007 | Ashton et al. ................. | 292/163 |

FOREIGN PATENT DOCUMENTS

| | | |
|---|---|---|
| DE | 37 42 268 | 6/1989 |
| EP | 1 323 501 | 7/2003 |
| GB | 2 072 438 | 9/1981 |
| WO | 96/05623 | 2/1996 |

\* cited by examiner

*Primary Examiner* — George Suchfield
(74) *Attorney, Agent, or Firm* — Michael J. Striker (57) ABSTRACT

An electrical device has a device body defining a cavity for receiving a battery pack, the battery pack has an arm and a sleeve that at least partially surrounds the arm, and the sleeve is rotatable relative to the arm around an axis of rotation.

23 Claims, 9 Drawing Sheets

ELECTRICAL DEVICE HAVING A BATTERY PACK WITH AN EASY ATTACHMENT AND RELEASE MECHANISM

CROSS-REFERENCE TO RELATED APPLICATION

The invention described and claimed hereinbelow is also described in European Patent Application EP 08100851.8 filed on Jan. 24, 2008. This European Patent Application, whose subject matter is incorporated here by reference, provides the basis for a claim of priority of invention under 35 U.S.C. 119(a)-(d).

BACKGROUND OF THE INVENTION

The present invention relates to electrical devices, such as a cordless power tools or battery chargers, which are configured to receive a removable battery pack.

Battery packs, especially those which are configured for use with hand-held power tools, are often removable to facilitate recharging and to permit continued use of the tool via multiple battery packs. So that the battery pack is securely fastened to the tool during use, the battery pack and tool cooperate to form latching means. For example, U.S. Pat. No. 5,213,913 describes latching members disposed on opposite sides of a battery pack for cooperating with latching shoulders within a tool handle.

Attaching such a battery pack requires only a minimal axial insertion force. However, releasing the tool is more complicated, since the user must grip around the pack so as to permit squeezing of the buttons found on opposite sides of battery pack while at the same time axially withdrawing the battery pack. This operation is awkward for some users, particularly those with small hands or weak grips, and can require extensive force especially for heavier battery packs that are even more securely fastened to the device housing. Such battery packs also tend to be larger than is desired in order to accommodate latching means which pivot along the external surface of the battery pack. It would be useful to have a battery pack that is more compact and which has a lock and release mechanism requiring less user effort.

SUMMARY OF THE INVENTION

Accordingly, it is an object of the present invention to provide an electrical device having a battery pack, which is a further improvement of the existing devices.

In accordance with the present invention may be, for example, a power tool or a battery charger. It comprises a device body defining a cavity for receiving a battery pack, wherein said battery pack comprises an arm and a sleeve that at least partially surrounds said arm such that said sleeve is rotatable relative to said arm along an axis of rotation. In such a design the same portion of the battery pack that is used for inserting or removing the pack is rotatable, and such rotation is a key part of the latching mechanism. This has the advantage that the user can conveniently insert and remove the battery pack using just one hand. Also, since the latching mechanism involves rotation rather than a inward and outward pivoting latching mechanism, the diameter of the battery pack is minimized.

The latching mechanism is inexpensive to manufacture and implement in the battery pack design in that it consists of a latch element on the sleeve cooperating with a latch element on the device body and within the cavity for securing the battery pack to the device body.

Latching of the battery pack is simplified if insertion of the battery into the cavity can automatically engage the latching system. As such, both the latch element on the battery pack body and the latch element on the cavity are advantageously provided with an angled profile surface, so that when the battery pack is inserted axially, the collision of the latching members will tend to urge the sleeve to rotate against the biasing force of a spring. With further axial insertion, the latch elements are no longer in contact, so that the biasing force urges the spring to its original orientation, wherein the latch members secure the battery pack within the cavity.

Since the battery pack body is non-rotatably coupled with the arm, and they are together inserted in a discrete orientation within the device body, they provide an anchor for rotating the sleeve that carries the latching mechanism. This is useful so that when the battery pack is received in the cavity, the sleeve is rotatable relative to the device body although it is in contact with the device body.

The battery pack alignment means located on the battery pack body cooperate with device alignment means within the cavity of the device body to prevent the battery pack body from rotating relative to said device body. As such, the battery pack body contacts said device body and cannot rotate relative to said device body. Since they are non-rotatably coupled, when the battery pack is received in the cavity, the battery pack arm also cannot rotate relative to said device body. It also does not contact said device body in the case where it is fully surrounded by the sleeve. The discrete coupling between the battery pack body and the device body ensures that the latching members on the sleeve are properly positioned for interacting with corresponding members in the cavity.

A spring biases the sleeve into a first position relative to the arm and this comprises both the resting position and the latched position for the battery pack. The spring provides the latching force, and overcoming the spring force is all that is necessary to insert or remove the battery pack. It may be advantageous to use a spring requiring only minimal torque, since this simplifies insertion and removal, but is still sufficient to secure the battery pack.

The spring is positioned in a sealed compartment between said sleeve and said arm so that it is protected from the user and from external elements. This also improves the appearance of the battery pack, giving it a more compact and sleek looking design.

So that the sleeve can be conveniently gripped for inserting or releasing the battery pack, means for improving grip are positioned on the sleeve. This is important since arguably rotational manipulation of the battery pack requires a better grip than would be necessary to engage one or more buttons on that same battery pack.

To assist in ejecting the battery pack from the device, a spring may be positioned in the device body cavity. Although such a spring does provide some resistance to insertion of the battery pack, it has the advantage that it facilitates removal of the battery pack.

In a first embodiment the battery pack further comprises an end plate that is secured to the arm and which secures the sleeve to the arm and battery pack body. This makes it possible for the user to conveniently insert the battery pack using only the palm of the hand. When axial insertion force is provided by the palm, the sleeve, but not the end plate rotates to engage the latching mechanism, resulting in "automatic" latching of the battery pack.

In another embodiment the sleeve is secured directly to the arm without using an end plate. This has the advantage that less parts are needed for achieving the same latch and release mechanism.

The invention is advantageously used for securing a battery pack to either a power tool or to a battery charger since in both cases it is important to establish a secure electrical connection between the battery contacts and the device body contacts. In both cases a smaller size is generally considered to be preferable and a convenient locking and releasing mechanism is useful so that the user can conveniently work without unnecessary interruption.

The method for inserting a battery pack into an electrical device is convenient for the user, and comprises the steps of first inserting the battery pack into a cavity in a device body of the electrical device, manually rotating a sleeve of the battery pack relative to an arm of the battery pack around an axis of rotation while further inserting the battery pack, and then releasing the sleeve so that at least one latching member on the sleeve engages at least one latching member on the device body. Alternatively, according to certain embodiments, the user does not need to manually rotate the sleeve of the battery pack, but simply provide axial insertion force to an end plate. The sleeve will nevertheless rotate due to the angled profile surfaces of the latch members. In this case, the sleeve will automatically rotate back to a latching position once the battery pack has been fully inserted.

The method for removing a battery pack from an electrical device is also convenient for the user, and comprises the steps of rotating a sleeve of the battery pack relative to an arm of the battery pack around an axis of rotation so as to disengage at least one latching member on the sleeve from at least one latching member on the device body, and pulling the battery pack from a cavity in the electrical device.

When the electrical device is a hand-held power tool it may be advantageous to position the cavity substantially within a handle which is used for gripping the hand-held power tool. Often this portion of the tool is already partially hollow, and the inclusion of the battery weight within the handle helps to better distribute the weight of the tool more uniformly, so that the tool is sturdier during use. The device body which defines the cavity for receiving the removable battery pack may itself be the handle, or it may be a portion of the handle, or it may be positioned within the handle, in which case the handle might have a separate outer shell for providing the gripping surface.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
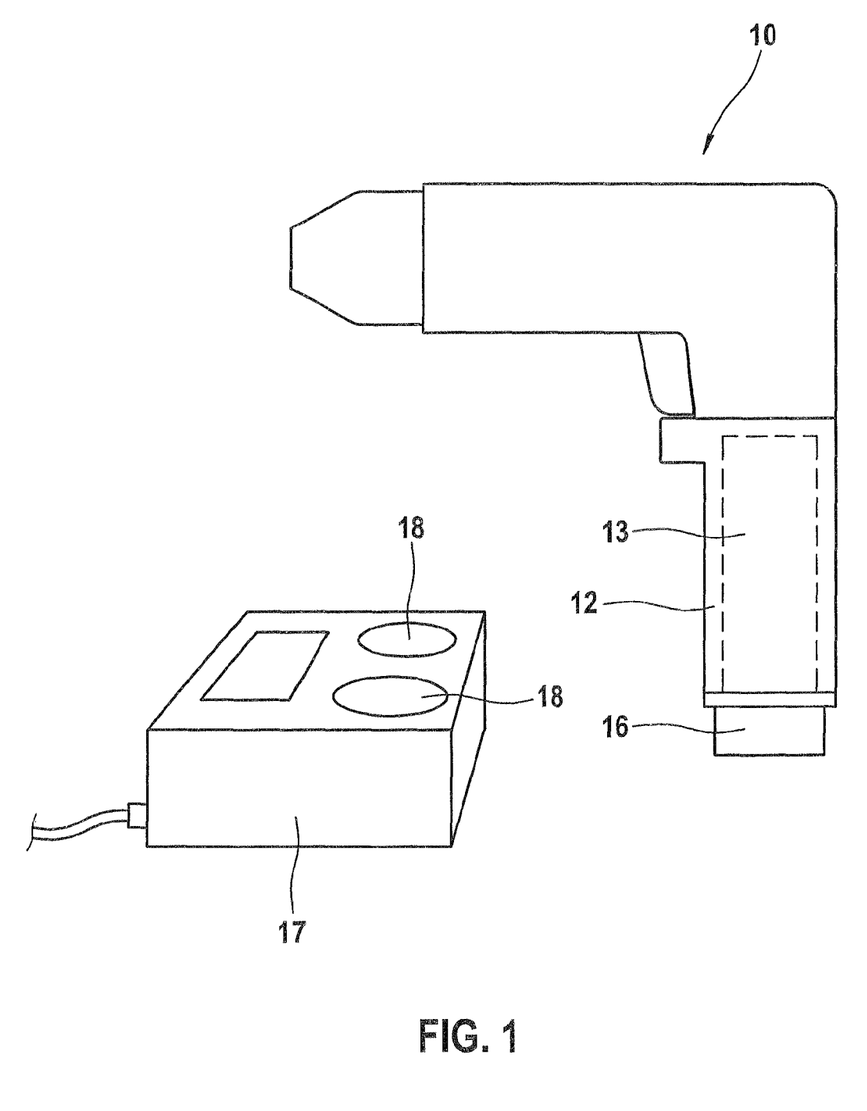
FIG. 1 is a perspective view of a power tool and battery charger. Internal features of the devices are shown in dashed lines.
Figure 2:
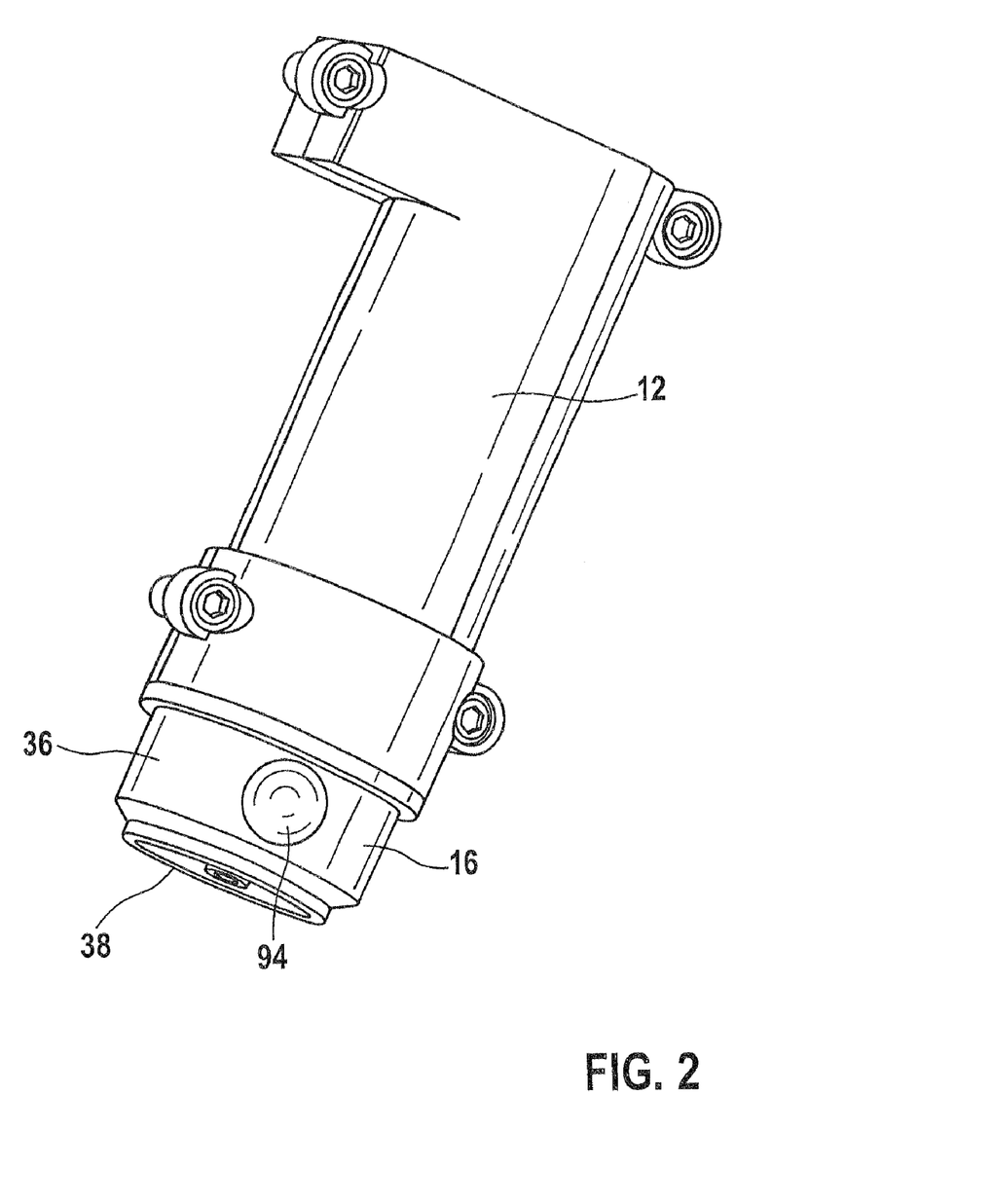
FIG. 2 is a perspective view of a device body portion of an electrical device with an inserted battery pack.
Figure 3:
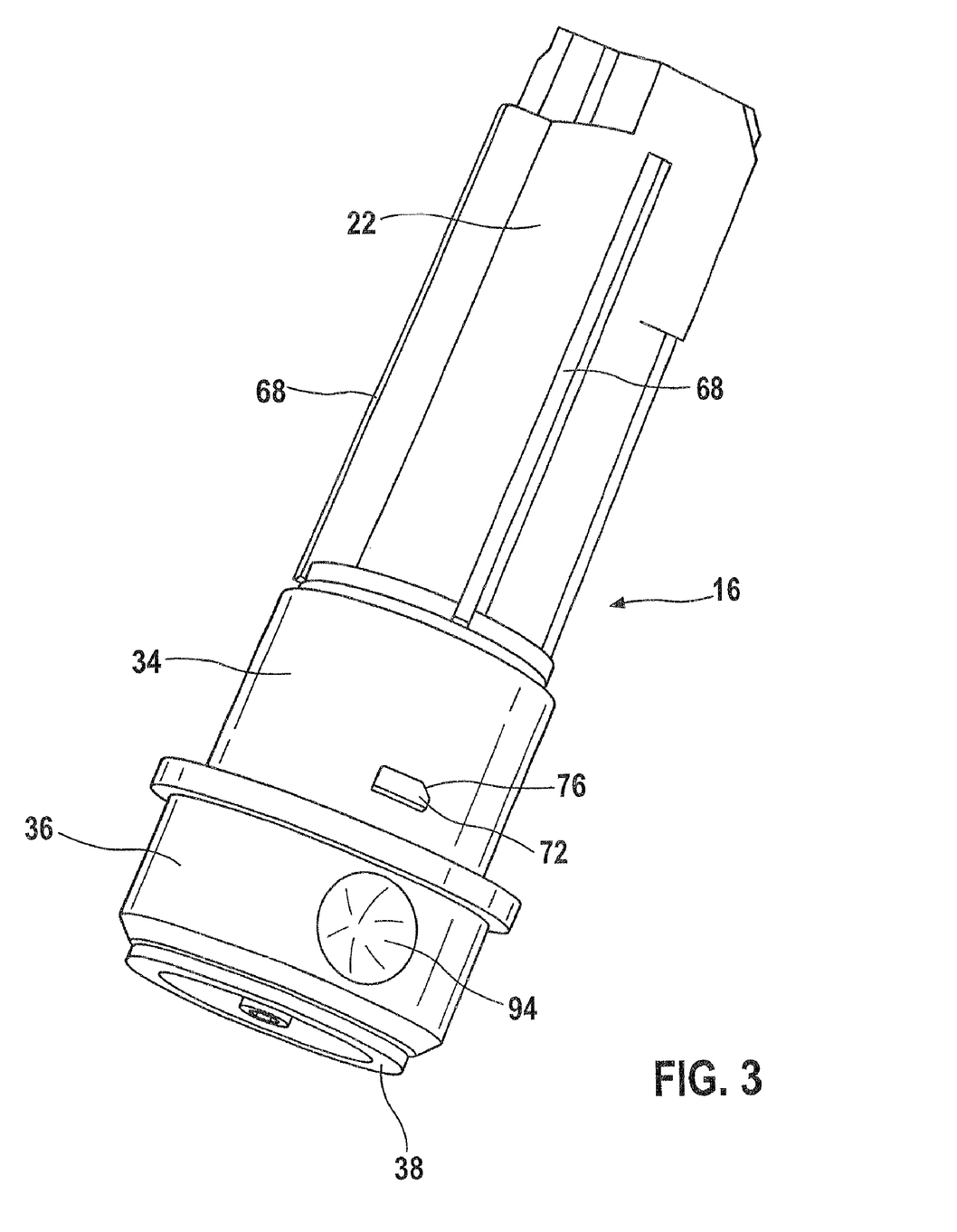
FIG. 3 is a perspective view of a battery pack for an electrical device.

Electrical devices which might be configured for use with a battery pack are shown in FIG. 1. For example, an exemplary hand-held power tool 10 (in this case a drill) is configured with a device body portion 12 that defines a cavity 14 into which a removable battery pack 16 can be inserted and secured (see FIGS. 2 and 3). In a similar way, a battery charger 17 can be provided with comparable features which are not described here in detail, but which may include one or more cavities 18 for receiving such a removable battery pack 16. In the case of the power tool 10, the cavity 14 is preferably substantially within a handle 13 used for gripping the power tool 10 during operation of the tool. The description that follows relates to an invention that may be incorporated into any of a variety of electrical devices that is beneficially configured with such a removable battery pack 16, for example to permit cordless operation, or to allow charging or storage of the battery pack 16.

Figure 4:
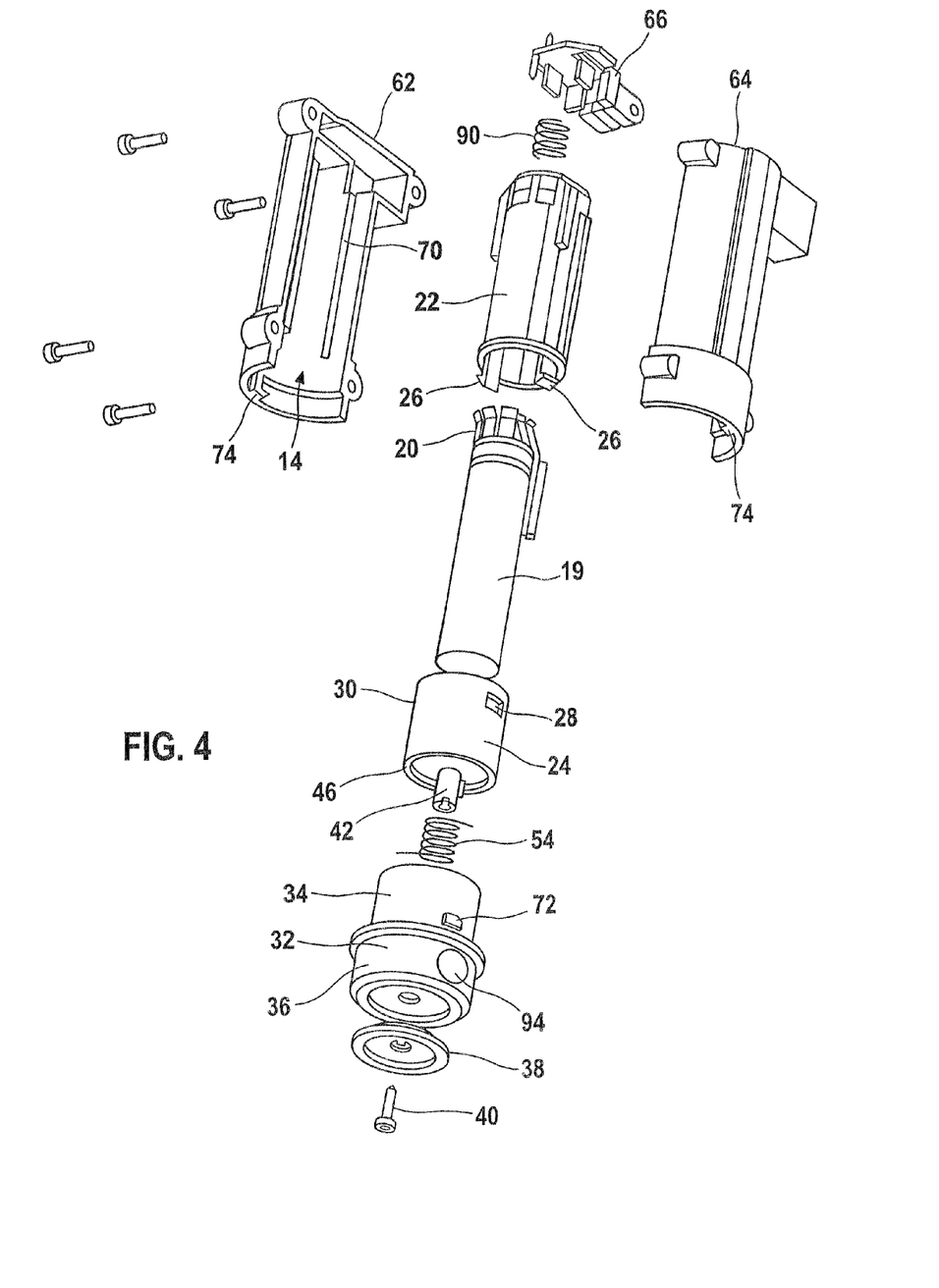
FIG. 4 is an exploded perspective view of a battery pack and device body portion of an electrical device.

A first embodiment of the battery pack 16 comprises a battery cell 19 and associated battery contact holder 20 which are surrounded by a battery pack body 22 and battery pack arm 24 which serve as housing for these elements and which are secured together via latches 26 in battery pack body 22 cooperating with cavities 28 in battery pack arm 24 so that there is no relative movement between them (see FIG. 4). Of course other means for securing the enclosure of the battery cell 19 are also possible. Depending on how permanent or tight a seal is desired, the battery pack body 22 and battery pack arm 24 may alternatively be secured via a separate adhesive material, such as glue, and with or without the use of structural means for latching, for example through the use of ultrasonic welding, as well as via any other method well-known to those skilled in the art.

Battery pack arm 24 has a generally cylindrical external surface 30 onto which is mounted a rotatable sleeve 32. The sleeve 32 has a first portion 34 of smaller diameter which is insertable into the cavity 14 and a second portion 36 of larger diameter which protrudes from the cavity 14 when the battery pack 16 is secured to the electrical device 10 (compare FIGS. 2 and 3).

Although in the illustrated example, the battery pack arm 24 is cylindrical, it need not have a smooth exterior face as in a cylinder. It can be other generally cylindrical shapes, so long as it provides the support surface for rotation of the sleeve 32, as will be further described below. Similarly, while the sleeve 32 in the illustrated embodiment almost completely surrounds the battery pack arm 24, but it need only partially surround it, so that the battery pack arm 24 provides a support surface for rotation of the sleeve 32.

Figure 5:
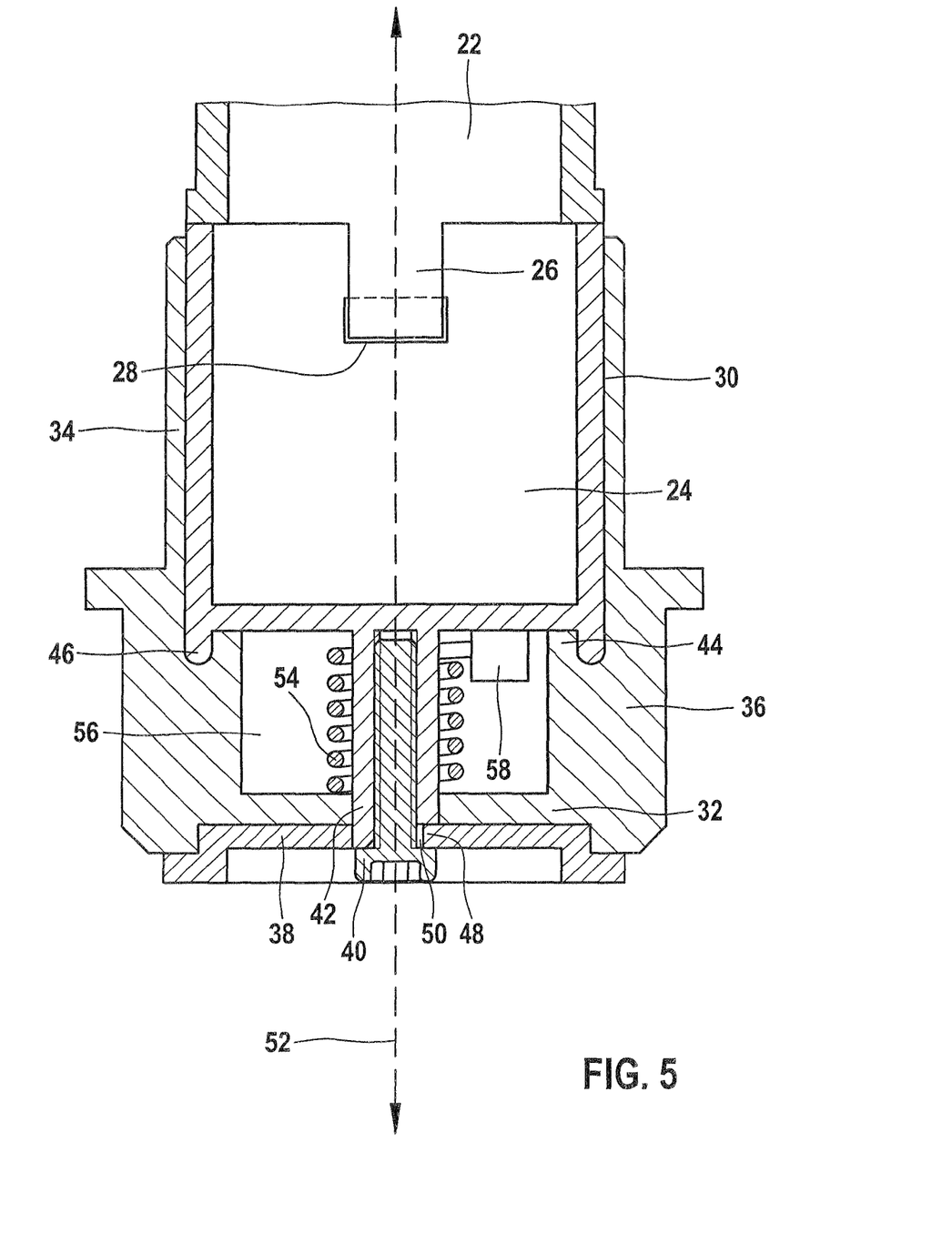
FIG. 5 is a section view of the battery pack of FIG. 2.

An end plate 38 is secured via a screw 40 to a protruding shaft portion 42 of the battery pack arm 24. Other means, such as a rivet or a plastic latch, could equally well secure the end plate 38 to the battery pack arm 24. The sleeve 32 has an inner annular shoulder 44 that wraps around annular ring 46 of battery pack arm 24 (see FIG. 5). As such, the sleeve 32 is not directly fastened to any part, but is sandwiched between the end plate 38 and the battery pack arm 24. The end plate 38 cannot rotate relative to the battery pack arm 24 since a protrusion 48 is received in a notch 50 in the protruding shaft portion 42 of the battery pack arm 24.

The sleeve 32 can rotate about an axis of rotation 52 that passes lengthwise generally through the center of battery pack arm 24, and in the preferred embodiment also through the center of the entire battery pack 16. That the entire battery pack 16 is generally symmetrical about this axis of rotation 52 is not an essential feature of the invention, and alternatives in which the battery pack sleeve 32 and battery pack arm 24 are offset from the remainder of the battery pack 16 are also possible.

Although the sleeve 32 is rotatable, it is biased against rotation in the counter-clockwise direction by a torsion spring 54 that is coiled around the protruding shaft portion 42 of the battery pack arm 24 and which resides in the generally sealed ring-shaped compartment 56 bounded by the sleeve 32 and the battery pack arm 24. The direction of bias (clockwise or counter-clockwise) is simply a matter of design choice.

Figure 6:
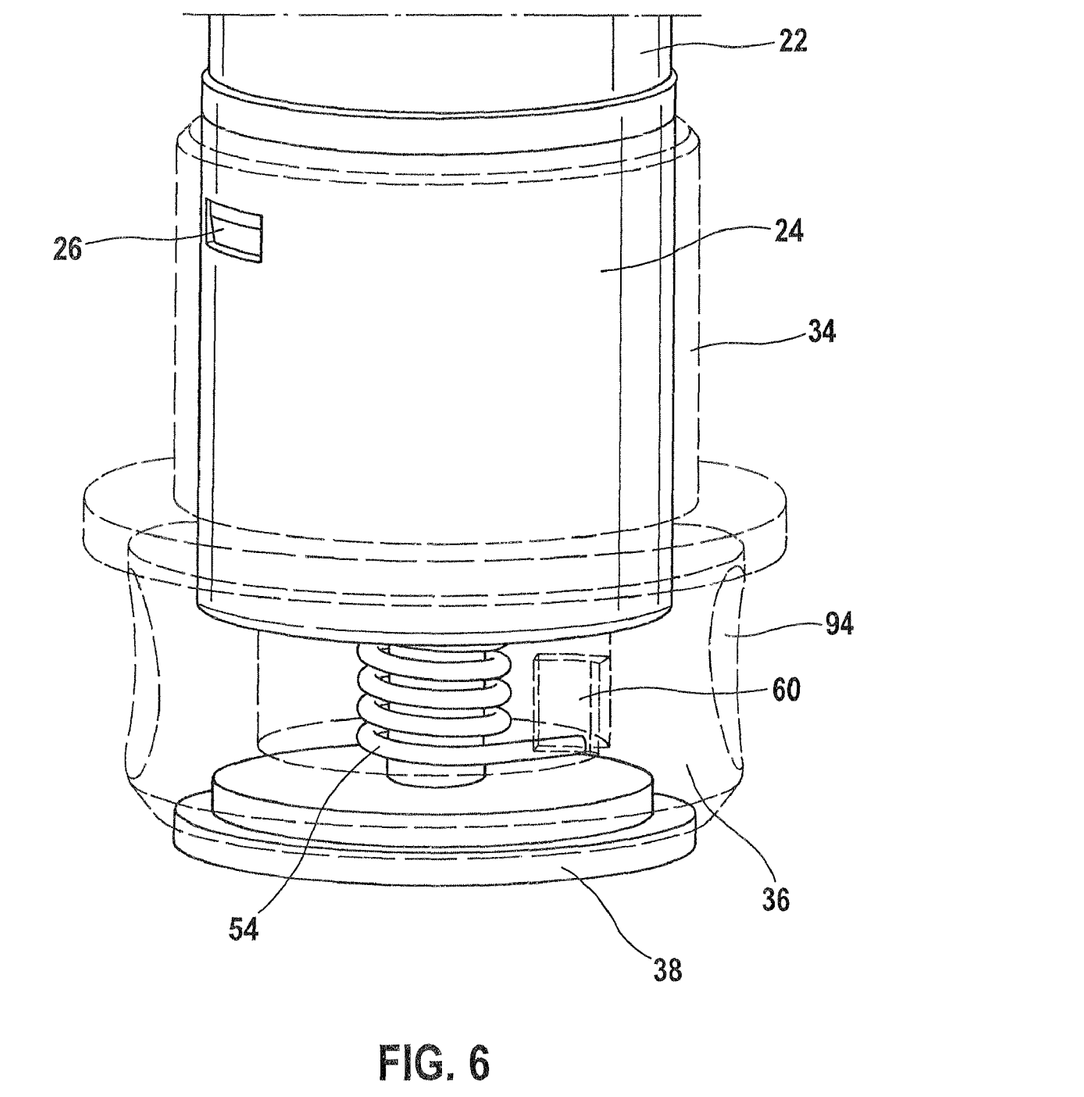
FIG. 6 is a perspective view of a battery pack wherein the sleeve is drawn in dashed lines.

One end of the torsion spring 54 is anchored to a protrusion 58 projecting from the battery pack arm 24 and the other is to a shelf 60 on the inside surface of the sleeve 32 (see FIG. 6). While a metal torsion spring 54 is preferred and suits itself very well to the shape of the compartment 56, other types of spring elements, such as compression or leaf springs can also be used provided that corresponding structural features are present to cooperate and position the spring elements. Plastic springs and/or elastomeric materials are also possible means for biasing the sleeve 32.

The cavity 14 in the device body portion 12 is formed by a first and second device body portion shell 62, 64 which join together to secure device contact holder 66. The device body portion 12 may alternatively be of unitary construction. When a battery pack is inserted into the cavity 14, the battery contact holder 20 makes electrical contact with the device contact holder 66 which in turn forms an electrical connection with the device electronics (not shown).

The cavity 14 should be complementary in shape to the battery pack body 22 so that the battery pack 16 can be inserted in at least one orientation so that the insertion axis is generally along the axis of rotation 52 of the sleeve 32.

However, the battery pack 16 should only be insertable in a number of discrete orientations. In other words, the battery pack body 22, once inserted into the cavity 14 should no longer be rotatable relative to the device body portion 12. This is accomplished via ribs 68 that serve as alignment members on the battery pack body 22 and complementary slots 70 that serve as alignment members in the cavity 14. Alternatively, the battery pack body 22 and cavity 14 might be polygonally shaped so that the polygonal faces serve as alignment members.

The battery pack body 22 should be in contact the device body portion 12 via the ribs 68 and slots 70, which should be sized to allow insertion and removal with little frictional resistance, but also preferably snug enough to ensure a secure fit with only minimal play once the battery pack 16 is fully inserted.

Since the battery pack arm 24 is secured to the battery pack body 22, it also does not rotate relative to the device body portion 12. Since it is fully surrounded by the sleeve 32, it also does not contact the device body portion 12.

Figure 7:
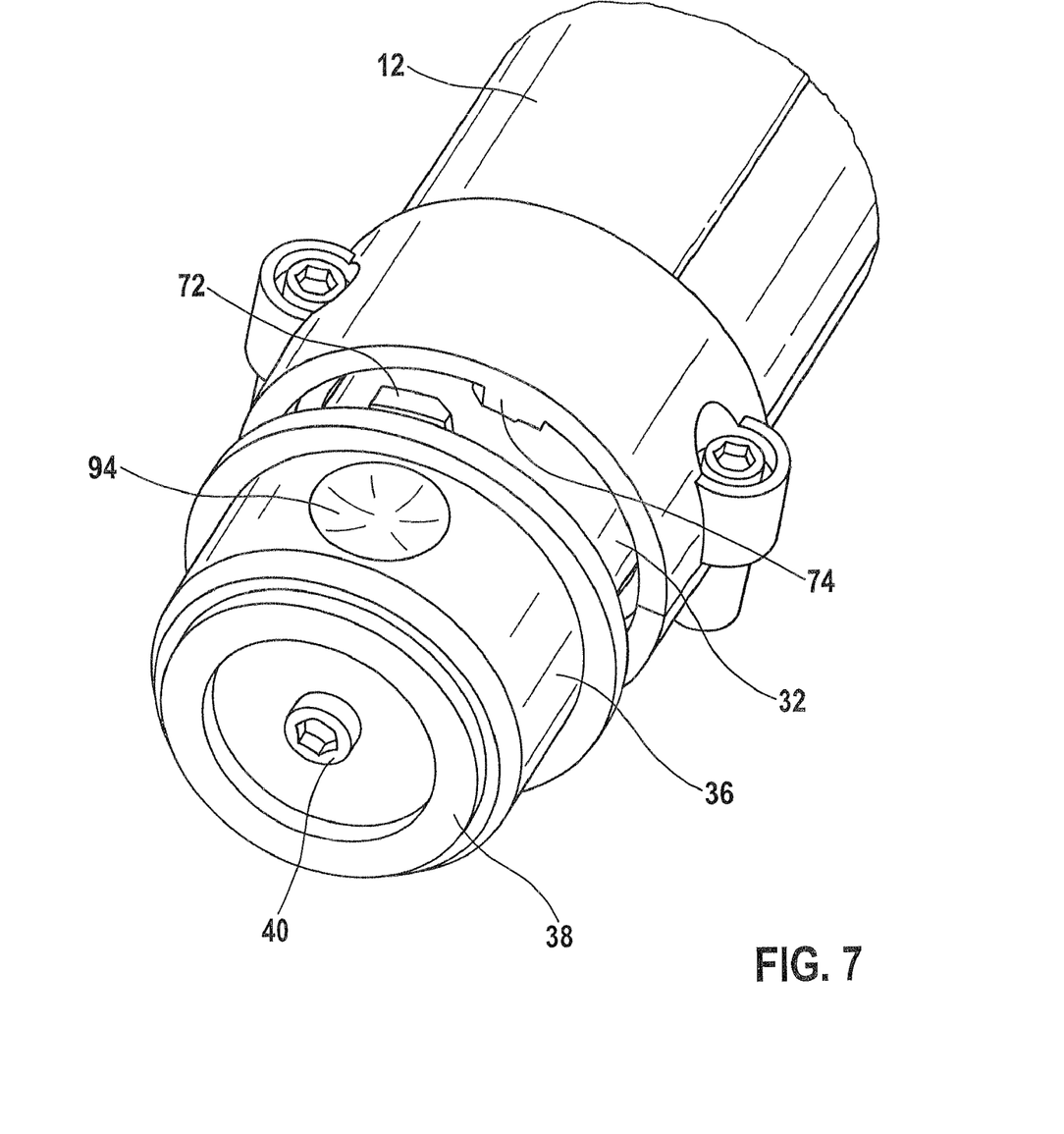
FIG. 7 is a perspective view of a battery pack only partially inserted into the device body portion of an electrical device.

In order to be fully inserted into the device body portion 12, the sleeve 32 of the battery pack 16 needs to be rotated relative to the battery pack body 22 and battery pack arm 24 against the force of the spring 54. This is because there is a protrusion 72 which would come into contact with an internal shoulder 74 when the battery pack is inserted in one of the discrete possible orientations (see FIG. 7).

Figure 8A:
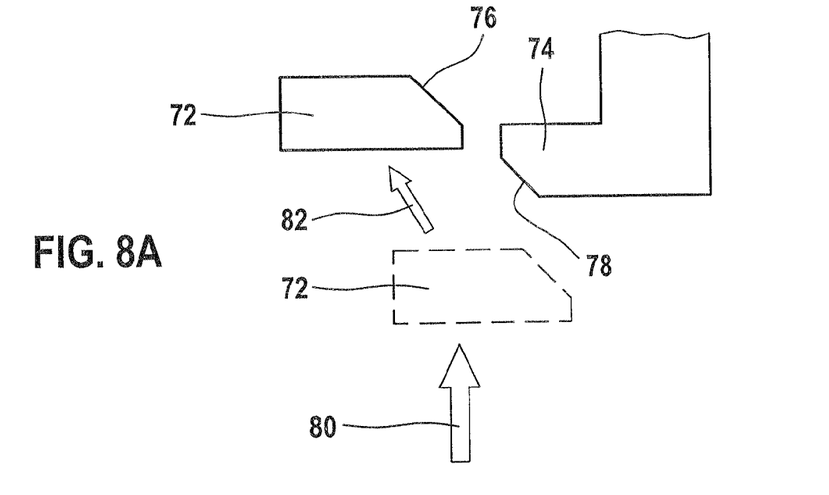
FIG. 8A is a schematic drawing illustrating the relative motion between latch elements during insertion of the battery pack into the electrical device. As relative movement is illustrated, an initial position for the moving element is shown in dashed lines.
Figure 8B:
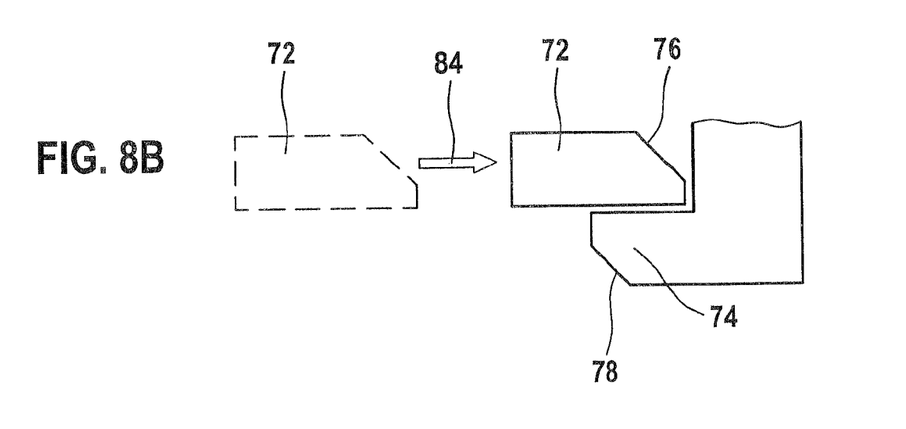
FIG. 8B is a schematic drawing illustrating the relative motion between latch elements during the latching of the battery pack to the electrical device. As relative movement is illustrated, an initial position for the moving element is shown in dashed lines.

However, both the protrusion 72 and the shoulder 74 are configured with angled profiles 76 and 78, characterized by angles 77 and 79, respectively. In response to an insertion force along axis 52 in the direction of arrow 80 (see FIG. 8A), a camming action between protrusion 72 and shoulder 74 urges the sleeve 32 to rotate counter-clockwise relative to the battery pack body 22 and battery pack arm 24 and against the force of the spring 54. As such, protrusion 72 moves generally in the direction of arrow 82. With further axial movement, the protrusion 72 clears the internal shoulder 74 and the force of the spring 54 urges clockwise rotation of the sleeve 32 so that protrusion moves generally in the direction of arrow 84 (see FIG. 8B). As mentioned before, whether the direction of bias is clockwise or counter-clockwise is a matter of design choice, and it is clearly evident how the structure might be inverted to achieve a force acting in one or the other direction.

The rotation of the sleeve 32 is effectively a self-rotation, in so far as the force applied by the user is merely an axial force. In the illustrated example the angles 77 and 79 of angled profiles 76 and 78 are approximately 45 degrees. In order to achieve effective self-rotation with minimal axial force it is preferable if these angles are 45 degrees or larger.

Figure 8C:
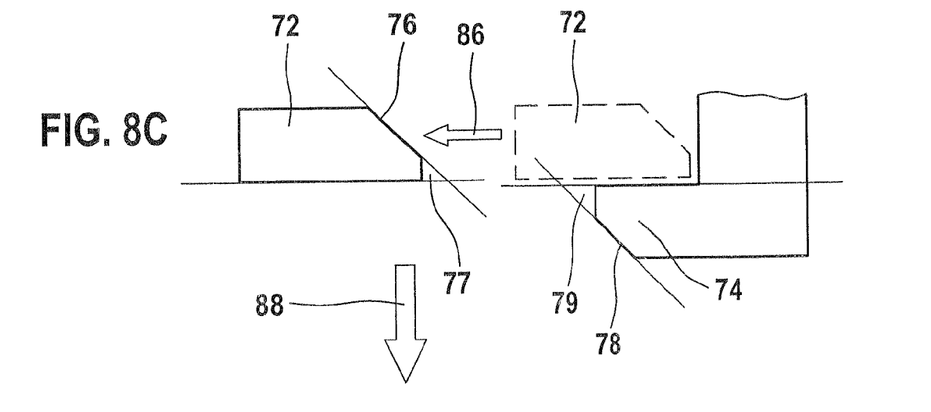
FIG. 8C is a schematic drawing illustrating the relative motion between latch elements during removal of the battery pack from the electrical device. As relative movement is illustrated, an initial position for the moving element is shown in dashed lines.

The protrusion 72 and internal shoulder 74 therefore comprise latching members that prohibit axial movement of the battery pack 16 unless the user rotates the sleeve 32 to separate the latching members. If the user rotates the sleeve 32 counter-clockwise so that the protrusion moves generally in the direction of arrow 86 and pulls outward along axis 52 in direction of arrow 88, the battery pack 16 may be removed (see FIG. 8C). Latching members with alternative shapes are also contemplated. While the latching members are similarly shaped in the illustrated embodiment, this does not need to be the case. Also, the invention might operate similarly if only one of the latching members is provided with an angled profile.

If it is considered desirable to eject the 16 battery pack, this could be accomplished by incorporating a compression spring 90 that opposes insertion of the battery pack 16 and which would be compressed and pre-loaded once the battery pack 16 is attached.

Figure 9:
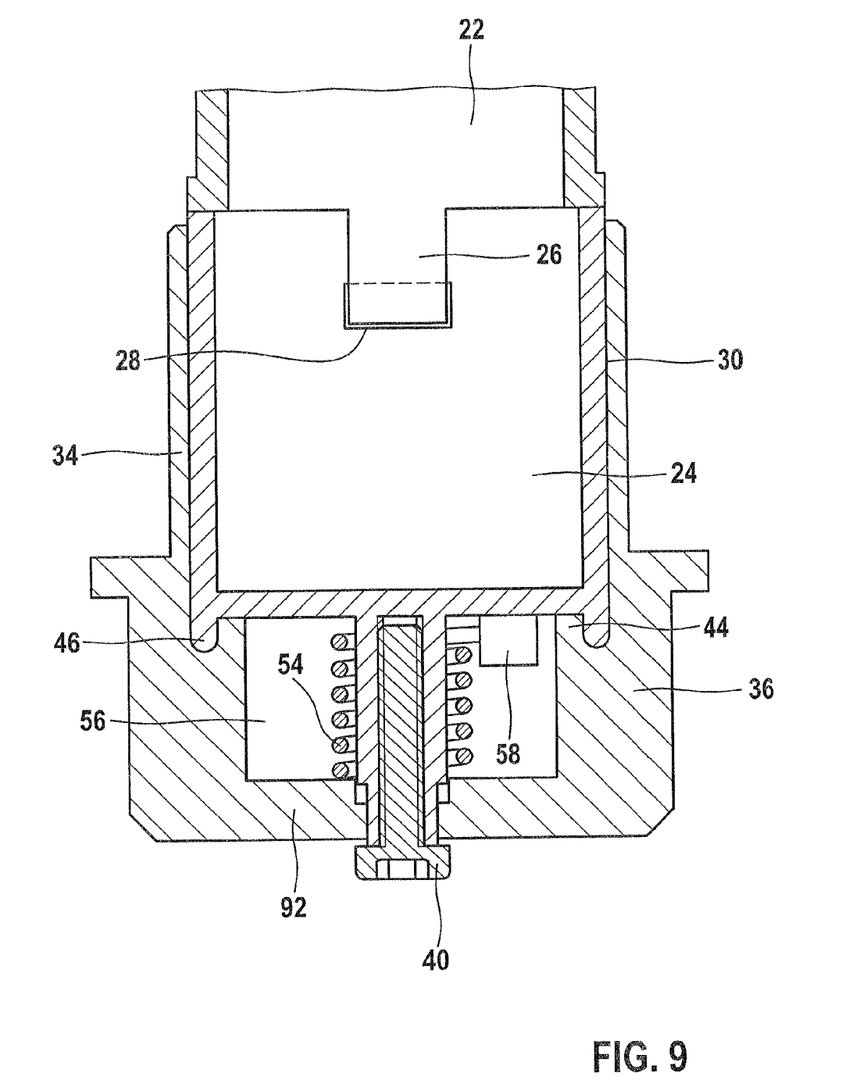
FIG. 9 is a section view of a second embodiment of a battery pack.

A second embodiment of the invention is illustrated in FIG. 9. In this design, the end plate 38 is omitted and the sleeve 92 is instead directly secured by screw 40 to the arm 24.

Since it is generally cylindrically shaped, the second sleeve portion 36 is preferably provided with grip-improving means, such as concave surfaces 94 for anchoring the finger tips of the user. Less or more of these grip-improving means can be provided. However, since the second sleeve portion 36 is never inserted into the cavity 14, it need not be cylindrically shaped, and many possible shapes including ones with flat or irregular surfaces are also possible, so that discrete and additional grip-improving means may not be necessary. Surface coverings, such as soft-grip elastic materials might also be applied to the sleeve 32 as grip-improving means.

It will be understood that each of the elements described above, or two or more together, may also find a useful application in other types of constructions differing from the types described above.

While the invention has been illustrated and described as embodied in an electrical device having a battery pack with an easy attachment and release mechanism, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An electrical device, comprising:
a device body defining a cavity;
a battery pack received in said cavity of said device body, said battery pack comprising an arm and a sleeve that at least partially surrounds said arm, said sleeve being rotatable relative to said arm about an axis of rotation;
biasing means configured for urging the sleeve into one direction of rotation around said axis of rotation toward a first position relative to said arm.

2. An electrical device as defined in claim 1, wherein said sleeve has a sleeve latch element which cooperates with a body latch element provided on said device body and within said cavity for securing said battery pack to said device body.

3. An electrical device as defined in claim 2, wherein said sleeve latch element on said sleeve and said device body latch element on said device body have angled profile surfaces.

4. An electrical device as defined in claim 1, wherein said sleeve is configured so that when said battery pack is received in said cavity, said sleeve contacts said device body and is rotatable relative to said device body.

5. An electrical device as defined in claim 1, wherein said battery pack body is configured so that when said battery pack is received in said cavity, said battery pack body which is non-rotatably coupled with said arm contacts said device body and cannot rotate relative to said device body.

6. An electrical device as defined in claim 1, wherein said battery pack has a battery pack body, further comprising battery pack alignment means located on said battery pack body and cooperating with device alignment means within said cavity of said device body to prevent said battery pack body from rotating relative to said device body.

7. An electrical device as defined in claim 1, wherein said biasing means are positioned in a sealed compartment between said sleeve and said arm.

8. An electrical device as defined in claim 1, further comprising grip-improving means positioned on said sleeve.

9. An electrical device as defined in claim 1, wherein said battery pack has a battery pack body and an end plate that is secured to said arm and which secures said sleeve to said arm and said battery pack body.

10. An electrical device as defined in claim 1, wherein the electrical device is configured as a hand-held power tool, and said cavity is substantially within a handle which is used for gripping said hand-held power tool.

11. An electrical device as defined in claim 1, wherein the electrical device is configured as a battery charger for charging said battery pack.

12. A electrical device a defined in claim 1, wherein said first position is configured as a resting position and latched position for said battery pack.

13. An electrical device as defined in claim 1, wherein said sleeve is directly secured to said arm.

14. An electrical device as defined in claim 13, wherein the other end of said biasing means is anchored to a shelf on the inside surface of said sleeve.

15. An electrical device as defined in claim 1, wherein one end of said biasing means is anchored to a protrusion projecting from said arm.

16. A battery pack comprising:
an arm; and
a sleeve that at least partially surrounds said arm, said sleeve being rotatable relative to said arm along an axis of rotation;
biasing means configured for urging said sleeve into one direction of rotation around said axis of rotation toward a first position relative to said arm.

17. A battery pack as defined in claim 16, wherein said biasing means are positioned in a sealed compartment between said sleeve and said arm.

18. A battery pack as defined in claim 16, further comprising grip-improving means positioned on said sleeve.

19. A battery pack as defined in claim 16, wherein said battery pack has a battery pack body and an end plate that is secured to said arm and which secures said sleeve to said arm and said battery pack body.

20. A battery pack as defined in claim 16, wherein said sleeve is directly secured to said arm.

21. A battery pack as defined in claim 16, wherein said first position is configured as a resting position and latched position for said battery pack.

22. A battery pack as defined in claim 16, wherein one end of said biasing means is anchored to a protrusion projecting from said arm.

23. A battery pack as defined in claim 16, wherein the other end of said biasing means is anchored to a shelf on the inside surface of said sleeve.

* * * * *